United States Patent [19]
Nomoto

[11] Patent Number: 5,818,526
[45] Date of Patent: Oct. 6, 1998

[54] SOLID STATE IMAGE PICKUP DEVICE HAVING A NUMBER OF VERTICAL SCANNING CIRCUIT UNITS WHICH IS HALF THE NUMBER OF PIXELS IN THE VERTICAL DIRECTION

[75] Inventor: Tetsuo Nomoto, Tatsuno-machi, Japan

[73] Assignee: Olympus Optical Co., Ltd., Tokyo, Japan

[21] Appl. No.: 614,275

[22] Filed: Mar. 12, 1996

[30] Foreign Application Priority Data

Apr. 3, 1995 [JP] Japan ................................ 7-099475

[51] Int. Cl.$^6$ .................................................. H04N 5/335
[52] U.S. Cl. ........................................... 348/302; 348/305
[58] Field of Search ..................................... 348/294, 302, 348/303, 307, 308, 305; H04N 5/335

[56] References Cited

U.S. PATENT DOCUMENTS

| | | | |
|---|---|---|---|
| 4,472,638 | 9/1984 | Nishizawa et al. | 348/308 |
| 4,597,012 | 6/1986 | Itoh et al. | 348/308 |
| 5,119,202 | 6/1992 | Hashimoto et al. | 348/308 |
| 5,262,871 | 11/1993 | Wilder et al. | 348/308 |

*Primary Examiner*—Andrew I. Faile
*Assistant Examiner*—Tuan V. Ho
*Attorney, Agent, or Firm*—Armstrong, Westerman, Hattori, McLeland & Naughton

[57] ABSTRACT

A solid-state image pickup device includes an array of rows and columns of pixels, a vertical scanning circuit having vertical scanning circuit units disposed to correspond to alternate pixel rows in the vertical direction, a horizontal scanning circuit for taking a pixel signal out of pixel rows being currently selected by the vertical scanning circuit, and selected-row changeover switch section consisting of a pair of first and second switches for transferring an output of one vertical scanning circuit unit to a preceding pixel row and a succeeding one of a certain row corresponding to this unit. A select signal is derived from the unit during two successive horizontal scanning periods, causing the first switch to turn on and the second one to turn off within a first horizontal scanning period, and also causing, during the following horizontal scanning period, the second switch to turn on and the first one to turn off. With such an arrangement, the vertical scanning circuit units are decreased in number to be half the pixel number in the vertical direction, thus enabling achievement of all-pixel independent sequential-scanning read scheme in the solid-state image pickup device.

11 Claims, 13 Drawing Sheets

SOLID STATE IMAGE PICKUP DEVICE HAVING A NUMBER OF VERTICAL SCANNING CIRCUIT UNITS WHICH IS HALF THE NUMBER OF PIXELS IN THE VERTICAL DIRECTION

BACKGROUND OF THE INVENTION

1. Field of the Invention

The present invention relates generally to image sensors, and more particularly to solid-state image pickup devices arranged to read out all pixels independently by sequentially scanning the same by use of a plurality of circuit units constituting a vertical scanning circuit which units are decreased in number to half of the pixel number in the vertical direction.

2. Description of the Prior Art

Generally, in solid-state image pickup devices of the X-Y addressing type for reading signals out of a pixel array consisting of rows and columns of picture elements (pixels) in X-Y addressing scheme, one vertical scanning circuit unit is required to control the image pickup state of one row of pixels in order to achieve the all-pixel independent sequential-scanning scheme. A typical configuration therefor is illustrated in FIG. 1, wherein the numeral "101" is used to indicate a horizontal scanning circuit, "$_{102}$" designates a vertical scanning circuit, "102-1" represents vertical scanning circuit units, and "103" shows pixels. The horizontal scanning circuit 101 is adapted for sequentially outputting signals of those pixels in a row being selected by the vertical scanning circuit 102, whereas the vertical scanning circuit 102 is for forcing each row of pixels to either the selected or nonselected state. To attain the all-pixel independent sequential-scanning, it is required to control each pixel row to be in the selected or nonselected state independently of one another; accordingly, as shown in FIG. 1, the vertical scanning circuit units 102-1 are to be identical in number with the pixels in the vertical direction, that is, the columns of the pixel array.

In the case where the prior art configuration as shown in FIG. 1 is employed to achieve the all-pixel independent sequential-scanning scheme, if the pixel pitch is reduced in the vertical direction, the pitch of scanning circuit units must be decreased accordingly, which will require further enhancement in micro-fabrication techniques for the manufacture thereof. In another aspect, it may be difficult to decrease the scanning-circuit pitch down to the pixel pitch; if this is the case, while the all-pixel independent sequential-scanning may be attainable by arranging vertical scanning circuits on the opposite sides of a pixel-array area as described, for example, in Japanese Patent Application Laid-open No. 6-113215, this will cause the resulting area to increase undesirably. In still another aspect, an increase in the pixel number in the vertical direction, i.e., the column number, should require that the vertical scanning circuit units be increased in number accordingly. The decrease in pixel pitch and/or increase in the pixel number may raise a serious problem in that the manufacturing yield of all-pixel independent sequential-scanning solid-state image pickup devices is lowered as compared with two-row mixed readout interlaced-scanning solid-state image pickup devices capable of attaining the same by use of a half-decreased number of vertical scanning circuit units equivalent to half of the vertical pixel number. Another prior art technique is disclosed in, for example, Japanese Patent Application Laid-open No. 6-98264, wherein the sequential scanning is accomplished using such half-decreased number of vertical scanning circuit units in a similar way to that of two-row mixed readout interlaced-scanning solid-state image pickup devices. Even with this technique, however, since an output signal is a mere mixture of signals of two pixel rows, it remains incapable of providing any desired degree of vertical resolution as equivalent to the vertical pixel number.

SUMMARY OF THE INVENTION

The present invention has been made to avoid the problems in the prior art solid-state image pickup devices of the all-pixel independent sequential-scanning scheme, and its main object is to provide a solid-state image pickup device capable of achieving such all-pixel independent sequential-scanning readout operations by use of vertical scanning circuit units the number of which is decreased to be half that of pixels in the vertical direction.

A solid-state image pickup device in accordance with the instant invention includes an array of rows and columns of pixels, a vertical scanning circuit including vertical scanning circuit units disposed so that they correspond to alternate ones of the pixel rows in the vertical direction, for selecting one row for readout from the pixel array, a horizontal scanning circuit for taking a pixel signal out of the readout row as selected by the vertical scanning circuit, first switch means for transferring an output of each of the vertical scanning circuit units toward a preceding pixel row of a corresponding pixel row associated with each circuit unit, and second switch means for transferring the output of each scanning circuit unit to a succeeding pixel row of the corresponding pixel row associated with each unit. The aforementioned each vertical scanning circuit unit outputs a select signal during two successive horizontal scanning periods. The first switch means is rendered conductive in a first horizontal scanning period of the two successive horizontal scanning periods and then becomes nonconductive in the subsequent horizontal scanning period, whereas the second switch means is rendered nonconductive in the first horizontal scanning period and then becomes conductive in the subsequent horizontal scanning period. Specifically, the switching operations of the first and second switch means are carried out during a horizontal blanking period.

With such an arrangement wherein the select signal is being generated from each vertical scanning circuit unit throughout the duration of two successive horizontal scanning periods, wherein, during the first one of such periods, the first switch means is rendered conductive while the second switch means is nonconductive, wherein during the subsequent period the second switch means becomes conductive whereas the first switch means is rendered nonconductive, and wherein the switching operations of the first and second switch means are performed during the horizontal blanking period, it becomes possible to achieve the all-pixel independent sequential-scanning readout by use of the vertical scanning circuit units the number of which is half the pixel number in the vertical direction without permitting occurrence of any mixture of outputs indicative of optical information of two pixels aligned in the vertical direction. The object can thus be accomplished.

It is another object of the invention to enable the first and second switch means to be controlled by a single input clock in the solid-state image pickup device arranged as described previously.

With the invention, this object may be attained by arranging the second switch means in such a manner as to be controlled by an inverted clock of the clock for controlling the first switch means.

It is yet another object of the invention to enable the first and second switch means of the solid-state image pickup device to be formed on the same substrate of the device.

According to the invention, this object may be achieved by employing MOS transistors for the first and second switch means.

It is still another object of the invention to enable any outputs of all rows of pixels to be uniform in the solid-state image pickup device arranged as described above.

With the invention, this object may be attained by additionally providing, between a corresponding pixel row associated with one vertical scanning circuit unit and the output section thereof, switch means being identical in arrangement with the first and second switch means and being constantly kept in the conductive state.

It is a further object of the invention to enable optical information-independent signal components as contained in all-pixel independent sequential-scanning readout signals to be obtained without having to employ any extra light-shielding mechanisms for the solid-state image pickup device.

With the invention, the object may be accomplished by arranging the vertical scanning circuit so as to non-destructively readout each pixel signal out of a pixel row being currently selected for readout state, and also to reset any optical information accumulated in each pixel being selected for readout state after completion of switching operations of the first and second switch means during a horizontal blanking period.

It is yet a further object of the invention to provide a solid-state image pickup device capable of effecting all-pixel independent subsequent-scanning readout by use of a decreased number of vertical scanning circuit units to half of the pixel number in the vertical direction without reducing the signal-to-noise (S/N) ratio.

In a further aspect of the invention, a solid stage image pickup device includes an array of rows and columns of pixels, a vertical scanning circuit having a plurality of vertical scanning circuit units disposed correspondingly to two successive pixel rows in a vertical direction, and a horizontal scanning circuit for taking a pixel signal out of pixel rows as selected by the vertical scanning circuit, first switch means for allowing the output of the vertical scanning circuit unit to pass through toward one corresponding pixel row associated with the vertical scanning circuit unit, second switch means for allowing the output of the vertical scanning circuit unit to propagate through toward the other corresponding pixel row associated with the same vertical scanning circuit unit, third switch means for forcing the one corresponding pixel row to a nonselected state, and fourth switch means for forcing the other corresponding pixel row to a nonselected state, thereby attaining the objects as mentioned previously.

DETAILED DESCRIPTION OF PREFERRED EMBODIMENTS

Figure 1:
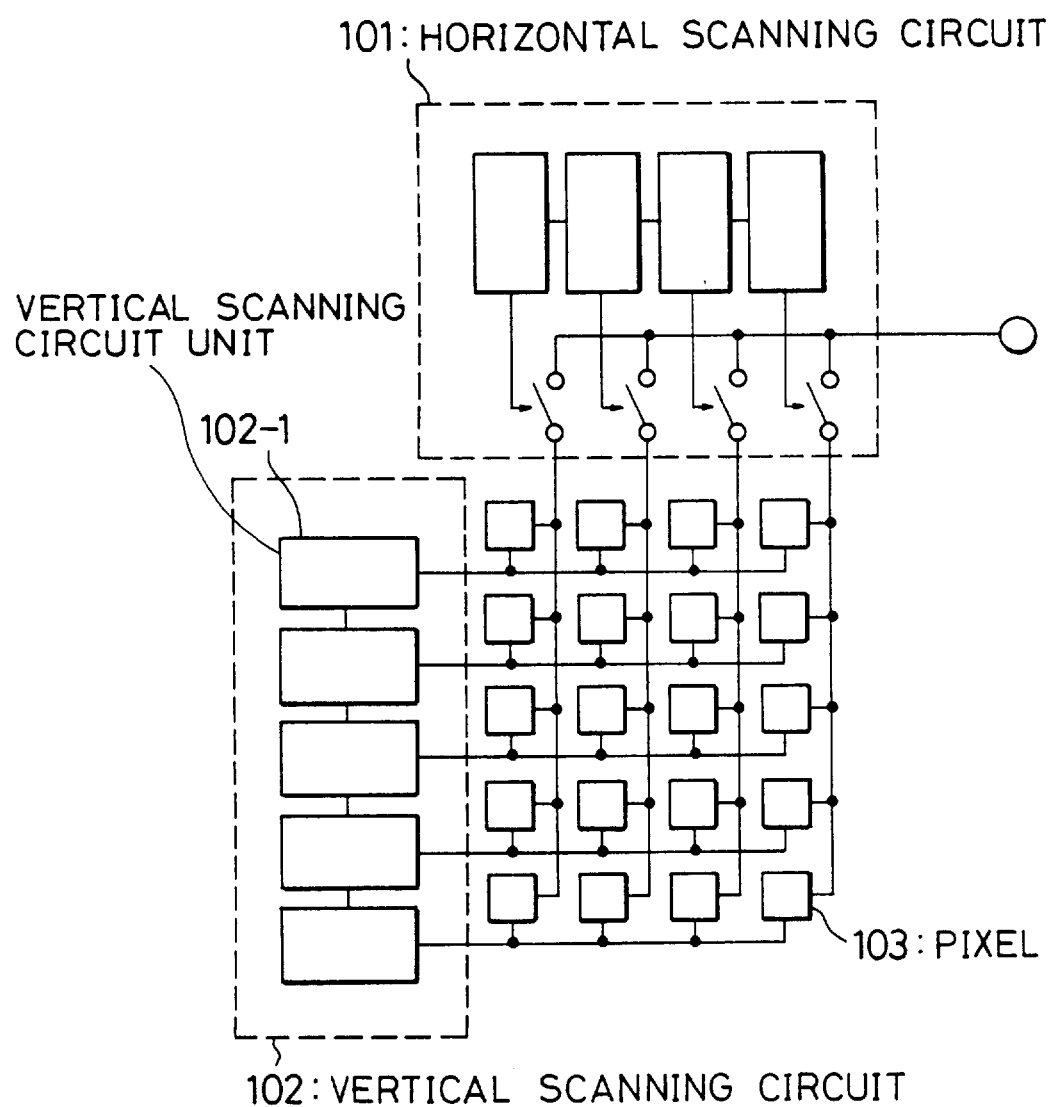
FIG. 1 is a diagram showing a circuit configuration of a prior art solid-state image pickup device.
Figure 2:
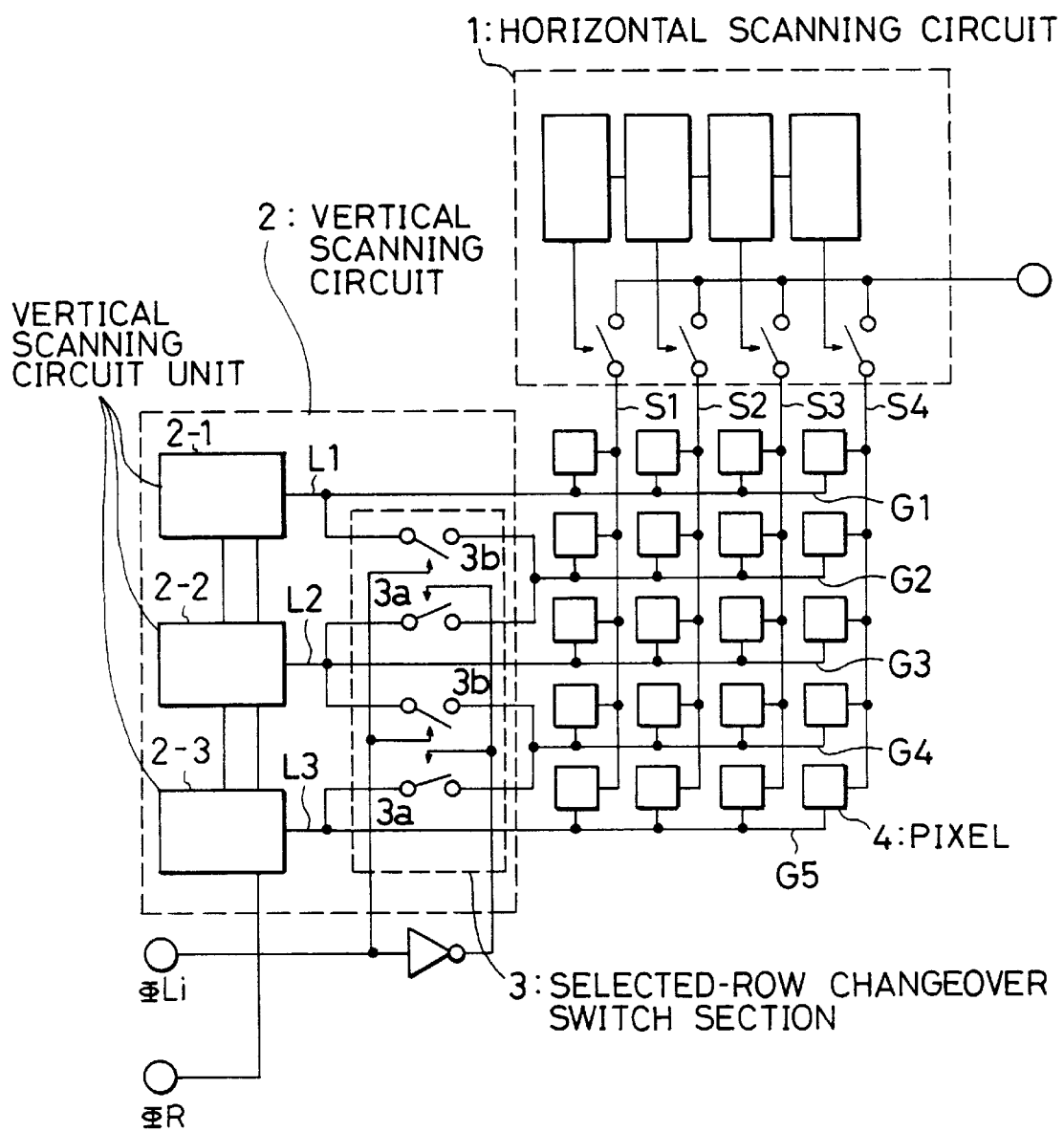
FIG. 2 is a diagram showing a circuit configuration of a solid-state image pickup device in accordance with a first embodiment of the invention.

Preferred embodiments of the invention will now be described with reference to the accompanying drawings. Refer to FIG. 2, which illustrates a circuit configuration of a solid-state image pickup device in accordance with a first embodiment of the invention. This embodiment assumes, by way of example, the use of an array of 4×5 matrix (four columns by five rows) of picture elements (pixels) 4, but the present invention should not exclusively limited thereto. In FIG. 2, the numeral "1" designates a horizontal scanning circuit for causing pixel signals to be outputted sequentially, "2" indicates a vertical scanning circuit, "2-1" to "2-3" show vertical scanning circuit units, "3" is a selected-row changeover switch section, "4" indicates pixels in a matrix form capable of non-destructively reading signals indicative of incident light, which pixels may be constituted from charge modulation device (CMD) elements. Parallel vertical signal transmission lines S1 to S4 ("Si" will be used hereinafter to identify of them, where i=1, 2, 3 and 4) extend on a substrate surface to intersect parallel horizontal pixel select lines G1 to G5 ("Gi" will be used hereinafter to identify of them, where i=1, 2, 3, 4 and 5). Pixels belonging to the same row in the horizontal direction are connected in common to a corresponding one of the horizontal pixel select lines associated therewith, whereas pixels in the same column in the vertical direction are coupled together to a corresponding one of the vertical signal lines. The vertical scanning circuit units 2-1 to 2-3 are arranged to provide the pixels with a select signal for enabling a pixel signal to be read out when a reset clock signal ΦR is at Low ("L") level while selection of pixels is made, and also for resetting, if the reset clock ΦR is at High ("H") level, any charge packet currently accumulated in the pixels.

The horizontal pixel select lines G1, G3, G5 of odd-numbered rows are arranged such that outputs L1, L2, L3 of the vertical scanning circuit units 2-1 to 2-3 are directly derived thereto respectively. The horizontal pixel select line G2 is arranged such that respective outputs L1, L2 of the vertical scanning circuit units 2-1, 2-2 are supplied thereto by way of a second and a first switch 3b, 3a of the selected-row changeover switch section 3. Similarly, respective outputs L2, L3 of the vertical scanning circuit units 2-2, 2-3 are fed to the horizontal pixel select line G4 of one even-numbered row through the second and first switches 3b, 3a of the selected-row changeover switch section 3.

The selected-row changeover switch section 3 is responsive to a selected-row changeover clock signal ($\Phi Li$ for changing the combination of rows for transmission of the outputs L1–L3 of the vertical scanning circuit units 2-1 to 2-3. When the clock $\Phi Li$ is at "H" level, the output L1 of the vertical scanning circuit 2 is fed to the horizontal pixel select lines G1, G2 while the output L2 is to the horizontal pixel select lines G3, G4 and the output L3 is to the horizontal pixel select line G5. Alternatively, when the clock $\Phi Li$ is at "L" level, the output L1 is fed to the horizontal pixel select line G1, the output L2 is to the horizontal pixel select lines G2, G3, and the output L3 is to the horizontal pixel select lines G4, G5, respectively. Each output Li (i=1, 2, 3) may be a three-value pulse signal, wherein the lowest potential level is for use in the nonselect state, the intermediate level is for reading signals in the select state, and the highest level is for resetting of signal charge packets in the select state. The timing of such highest clock level for resetting selected pixels corresponds to a specific time point whereat the reset clock $\Phi R$ goes high (at "H").

Figure 3:
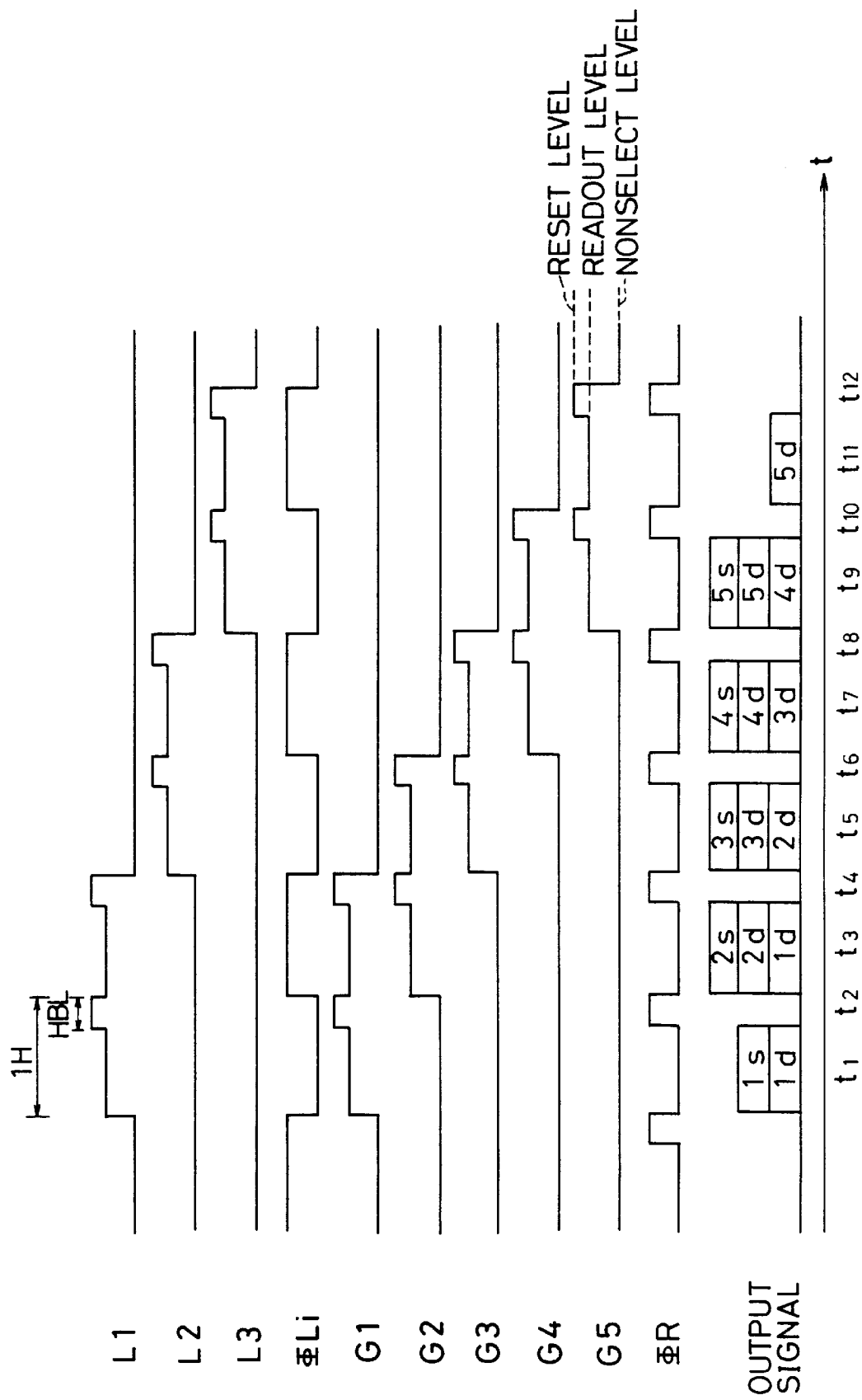
FIG. 3 is an illustration of a timing diagram showing the pulse sequence for the output operation of the embodiment shown in FIG. 2.

Next, the operation of the solid-state image pickup device thus arranged will be described with reference to a timing diagram shown in FIG. 3. During a period from t1 to t4, one horizontal pixel select line G1 is in the selected state. Since the clock $\Phi Li$ is at "L" from time $t_1$ to $t_2$, any pixel rows other than the first pixel row are not selected. In response to the reset clock $\Phi R$ which goes high at time t2 during a horizontal blanking period (HBL), optical information is reset with respect to the pixels in a currently selected row; thereafter, the clock $\Phi Li$ becomes at "H" level. This clock $\Phi Li$ remains at "H" level within a period from $t_3$ to $t_4$ causing the first and second pixel rows to be selected. Regarding the first row of pixels, substantially no optical information may be stored therein due to the fact that the resetting of these pixels is just completed at time $t_2$. Consequently, at time $t_3$, a sum signal is derived as an output signal, which sum signal totals a dark output (1d) of the first pixel row, a dark output (2d) of the second pixel row, and an output (2s) indicative of optical information of the second pixel row. Any optical information stored in these first and second pixel rows are then reset at time $t_4$ in response to receipt of the reset clock $\Phi R$.

Similarly, during period $t_5$, a dark output (2d) of the second row of pixels, a dark output (3d) of the third row of pixels, and an output (3s) indicative of optical information are outputted together; during a period $t_7$, a dark output (3d) of the third row of pixels, a dark output (4d) of the fourth row of pixels, and an output (4s) indicative of optical information are outputted together; during a period $t_9$, a dark output (4d) of the fourth row of pixels, a dark output (5d) of the fifth row of pixels, and an output (5s) indicative of optical information are obtained together. As a consequence, an output representative of each optical information may be read out of the second, third, forth and fifth pixel rows during respective periods $t_3$, $t_5$, $t_7$, $t_9$ independently of one another.

As is apparent from the previous description, the readout signal is a total of the dark outputs of two pixels and an output indicative of optical information stored in one pixel. Since an effective signal required as a video signal is only the signal indicative of optical information, two-pixel dark outputs are to be subtracted from the readout signal in order to provide such effective video signal. In this case, if the dark output from each pixel is constant, such video signal is obtainable by simply subtracting a fixed value from the readout signal; if the dark outputs are not constant among pixels, simple subtraction of a fixed value from the readout signal will cause the "dark fixed pattern noise" to take place in the resulting video signal. Typically, such dark fixed-pattern noise may be removed by use of a technique as follows: first, read the dark outputs from the image pickup device; then, store a resultant signal in a memory; and, thereafter, subtract from a signal being read out of the image pickup device a dark output of a corresponding pixel(s) as has been stored in the memory. With such proceedings, the dark fixed-pattern noise can be removed successfully.

To obtain the dark output from the image pickup device, mechanical or optical shutters may be employed to prevent incident light from entering the image pickup device while a signal is being read out. The use of such mechanical or optical shutters, however, may lead to an increase of parts or components required in number, causing cost to increase and reliability to decrease accordingly. In this respect, a specific method is proposed for obtaining dark output from the image pickup device without having to employ such extra light shielding mechanisms for the image pickup device, as will be described below.

It has been explained that the solid-state image pickup device embodying the invention is arranged such that the optical information-indicative output of each pixel row is obtained by performing a readout operation of a next signal while the combination of selected rows is changed by causing the selected-row changeover switch section 3 to switch to a different state after completion of reading an optical information-indicative signal from currently selected pixels and then resetting the optical information.

Principally, by modifying the switching timing of the selected-row changeover switch section 3 to be shifted at a time point before resetting of optical information, it becomes possible for the solid-state image pickup device to read the dark output, which contains no optical information of pixels of selected row, without requiring the use of any additional light shielding mechanisms.

Figure 4:
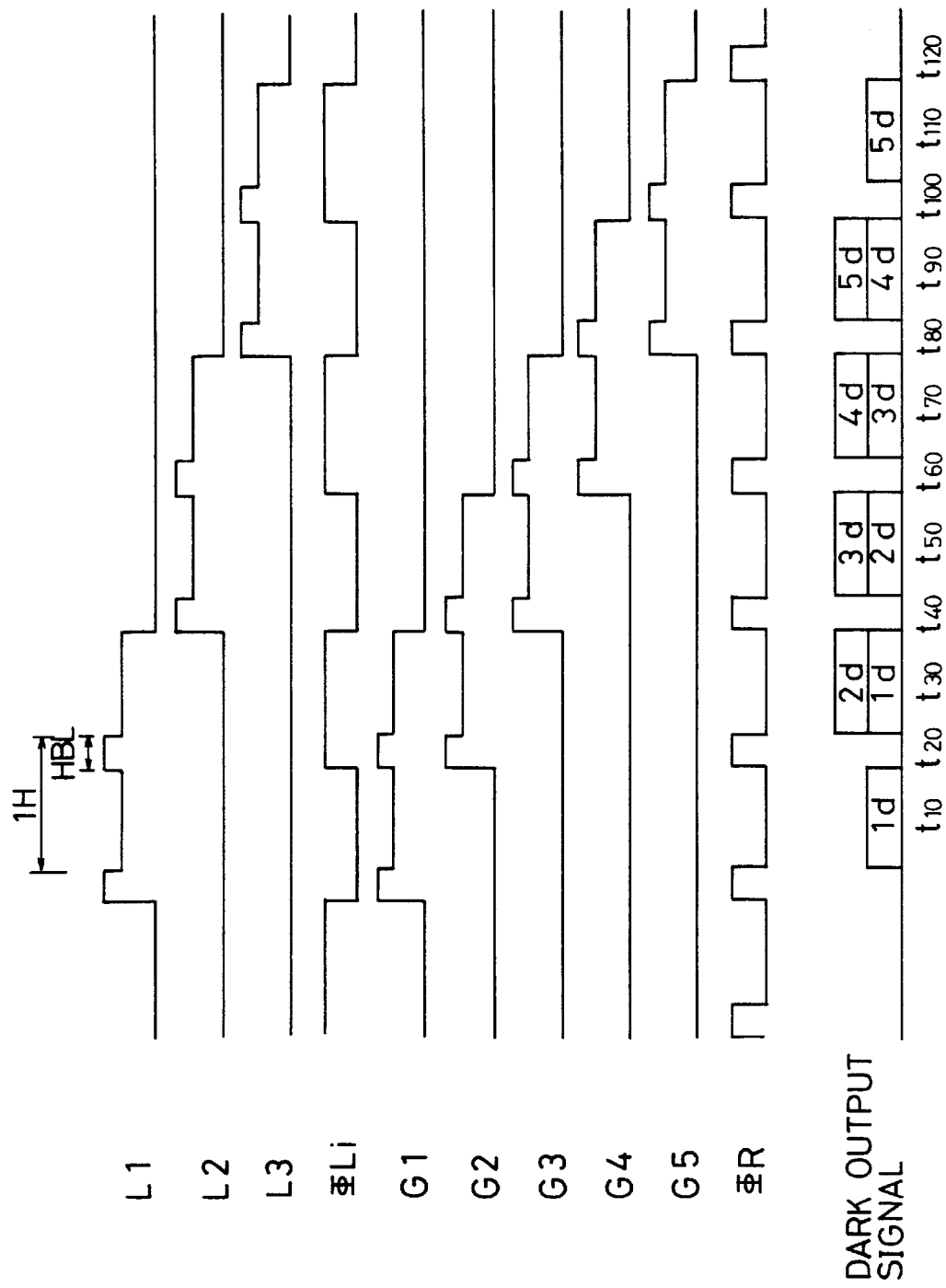
FIG. 4 is an illustration of a timing diagram showing the pulsing sequence for the dark-output extraction operation of the embodiment of FIG. 2.

The dark-output readout operation will now be described with reference to a timing diagram shown in FIG. 4. Since, at time $t_{40}$ for instance, the selected-row changeover clock signal $\Phi Li$ is at "L" level while the reset clock signal $\Phi R$ is at "H" level, a reset level voltage is applied to the horizontal pixel select lines G2, G3, thus resetting the signal charge of the pixels of the rows corresponding to these select lines G2, G3. At time t 50, since $\Phi Li$="L" and $\Phi R$="H", a signal-readout level voltage is applied to the horizontal pixel select lines G2, G3 causing signals to be read out of pixel rows corresponding to these select lines G2, G3 just after completion of the resetting operation. In this case, pixels of the rows corresponding to such select lines G2, G3 being currently selected just after the resetting will store therein optical information during a certain length of time period ranging from the end of such reset operation to the start of a read operation; however, since this period is extremely shortened as compared with normal optical-information storage period (i.e., one vertical scanning period), the storage effect is negligible from practical viewpoints. This means that the resulting readout signal can be regarded as a dark output signal.

While the previous discussions are made under assumption that a pixel signal consists of both a dark output and an output representative of optical information, such dark output will be zero in the case of, for instance, certain solid-state image pickup devices arranged to directly readout change packets as produced by incident light. In this case, a signal read from each selected pixel consists of only an effective output indicative of optical information originated from one pixel, thus eliminating the need to subtract any dark output for constructing a video signal. More specifically, in the timing diagram of FIG. 3, an output available is only the output (3s) representative of optical information of pixels of the third row at time $t_5$, for example.

With the embodiment, the output of each vertical scanning circuit units is a three-value level signal while each unit is associated with a single horizontal pixel select line; alternatively, this embodiment may be arranged such that select signal line and reset signal line are constituted from separate lines thus providing two horizontal pixel select lines with respect to each row.

Furthermore, while the embodiment is arranged to operate in such a way that optical information as stored in selected pixels is reset in response to a change of the reset clock signal ΦR to "H" level during the horizontal blanking period, such reset operation will be no longer required in the case of destructive readout scheme wherein reading of signals per se functions also as the resetting of optical information stored; in this case, the output from each vertical scanning circuit unit may be a two-value or bilevel pulse signal potentially indicative of select and nonselect states.

Figure 5:
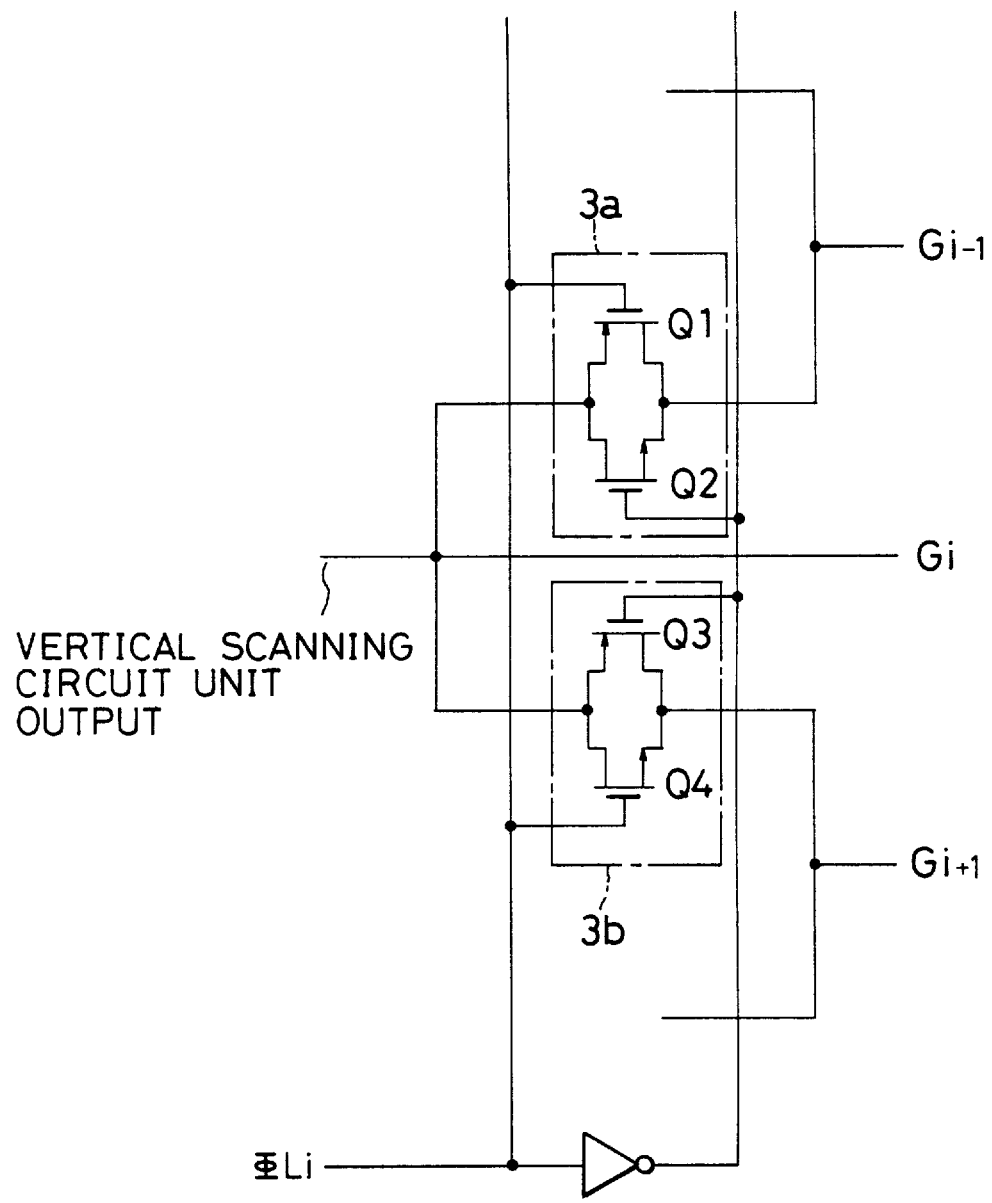
FIG. 5 is a diagram showing a configuration of a switch section for switching selected rows as adapted in the embodiment of FIG. 2.

Illustrated in FIG. 5 is a detailed circuit configuration of the selected-row changeover switch section 3. In FIG. 5, a select signal as derived from one vertical scanning circuit unit shown is coupled to (i) the horizontal pixel select line Gi, (ii) a common node of a source of a metal oxide semiconductor (MOS) transistor Q1 of P-channel conductivity type and a drain of N-channel MOS transistor Q2, and (iii) a node of a source of P-channel MOS (PMOS) transistor Q3 and a drain of N-channel MOS (NMOS) transistor Q4, wherein the PMOS transistor Q1 and NMOS transistor Q2 constitute a first switch 3a, whereas the PMOS transistor Q3 and NMOS transistor Q4 constitute a second switch 3b. The PMOS transistor Q1 and NMOS transistor Q4 have gates to which the clock ΦL1 is supplied, whereas the NMOS transistor Q2 and PMOS transistor Q3 have gates at which an inverted signal /ΦLi of the selected-row changeover clock signal ΦLi is inputted. Accordingly, when ΦLi is at "H" level, the PMOS transistor Q3 and NMOS transistor Q4 turn on causing the select signal derived from the vertical scanning circuit unit to be supplied to the horizontal pixel select lines Gi, Gi+1. Alternatively, when ΦLi is at "L" level, the PMOS transistor Q1 and NMOS transistor Q2 turn on causing the select signal from the vertical scanning circuit unit to be fed to the horizontal pixel select lines Gi-1, Gi.

Note that, while the selected-row changeover switch section 3 is similar in operation to a field changeover switch as adapted in two-row mixed readout interlace-scanning solid-state image pickup devices, it may take relatively longer time for the switches to perform such changeover operations due to the fact that, in case of interlaced scanning, the switch changeover is effected during the vertical blanking period. With the instant invention, since the selected-row changeover switch section 3 is designed to switch during a horizontal blanking period, faster switching operations is required as compared with those in the field changeover switch in the two-row mixed readout interlace-scanning solid-state image pickup devices. To do this, when such switches are comprised of MOS transistors, one of the following methods may be used: increasing the power supply voltage in potential, increasing the MOS transistors in gate width, decreasing these transistors in gate length, enhancing the output buffering ability for switch-controlling clock signals, and others.

Figure 6:
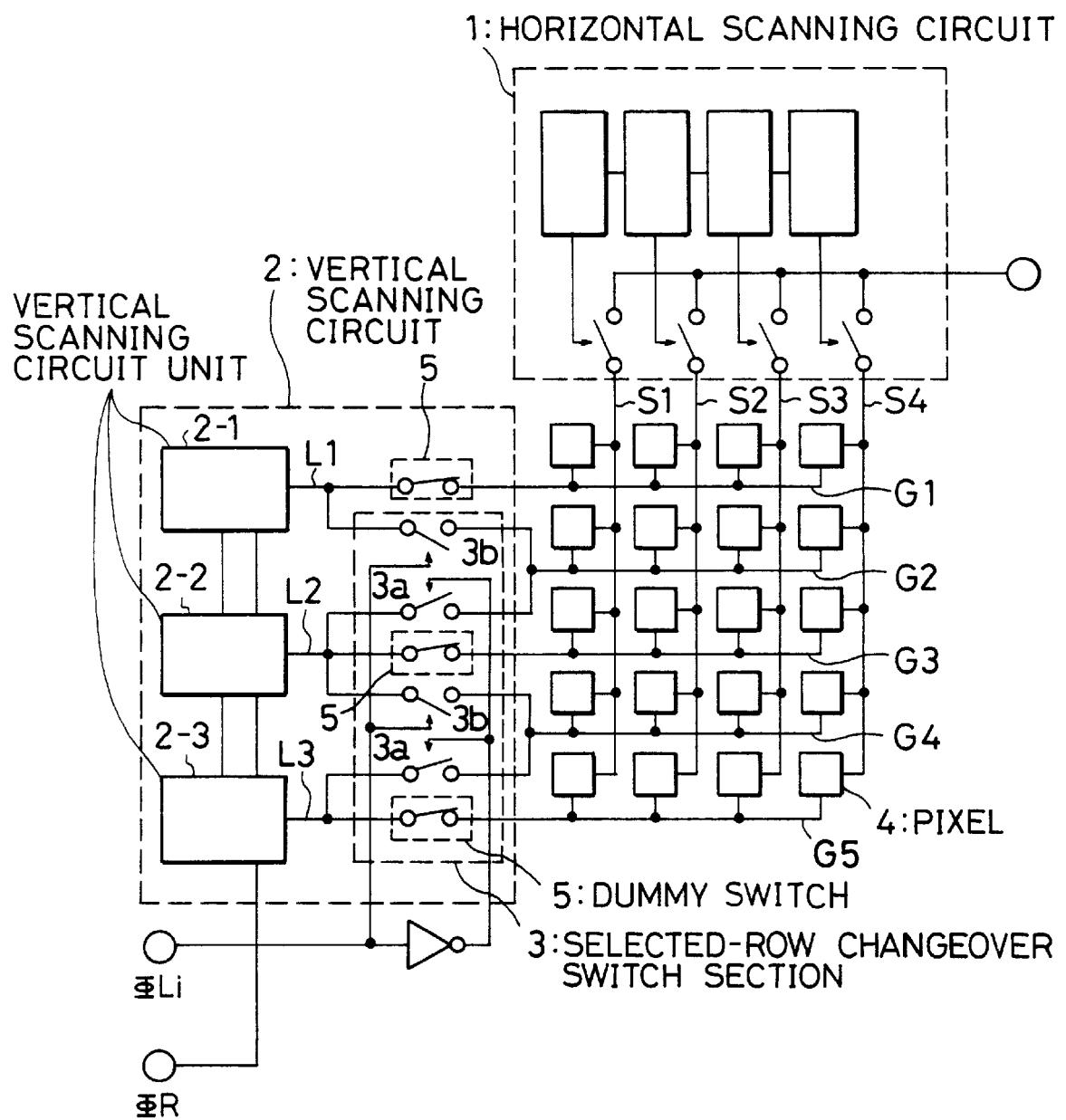
FIG. 6 is a diagram showing a circuit configuration of a solid-state image pickup device in accordance with a second embodiment of the invention.

In the present invention, it may be desirable that the select signal derived from the vertical scanning circuit unit is applied to respective pixel rows under substantially the same condition in order to obtain an output of each row independently. However, with the embodiment configuration shown in FIG. 2, the output (selection signal) Li (i=1, 2, 3) of each vertical scanning circuit unit is directly transferred via no switches of the selected-row changeover switch section 3 toward a corresponding one of the odd-numbered alternate rows of pixels, and yet is supplied to a corresponding one of the remaining even-numbered rows of pixels by way of one associated switch in the selected-row changeover switch section 3. Such arrangement may possibly cause the resulting output signal to be variable or inconsistent in potential between the odd-numbered pixel rows and the remaining even-numbered pixel rows. Fortunately, this can be avoided by additionally providing dummy switches 5 between the vertical scanning circuit units 2-1 to 2-3 and alternate horizontal pixel select lines G1, G3, G5 associated with the odd-numbered pixel rows, wherein the dummy switches 5 are similar in structure to the switches 3a, 3b constituting the selected-row changeover switch section 3, and are distinguished therefrom in that these dummy switches are rendered conductive constantly. A solid-state image pickup device employing such arrangement of adding the "constantly-on" dummy switches 5 is illustrated in FIG. 6 as a second embodiment of the present invention.

While the first and second embodiments specifically employ the configuration wherein the vertical scanning circuit units 2-1 to 2-3 are disposed to positionally correspond to the odd-numbered pixel rows, these embodiments may alternatively modified such that the vertical scanning circuit units are disposed to correspond in position to the even-numbered pixel rows with each vertical scanning circuit unit being connected to a pair of preceding and succeeding ones of its associated row through the first and second switches respectively. With such an arrangement also, substantially the same advantages may be achieved. Additionally, according to the invention, since care should be taken only to the selected states of horizontally aligned pixel rows, the arrangement therefor will be free from any limitations as far as the horizontal scanning circuit 1 is adapted to allow signals to be sequentially outputted from respective pixels of such pixel rows.

Figure 7:
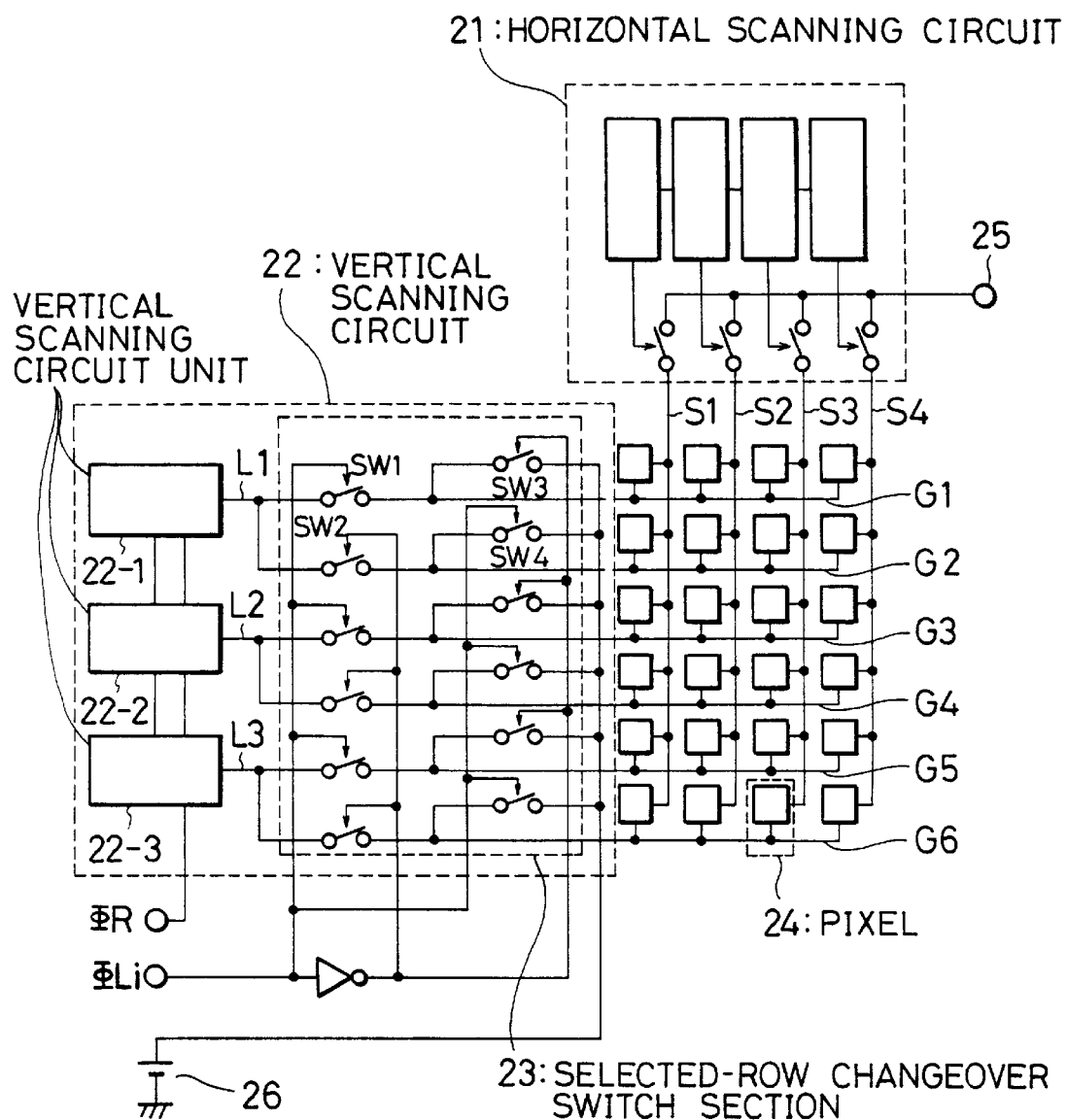
FIG. 7 is a diagram showing a circuit configuration of a solid-state image pickup device in accordance with a third embodiment of the invention.

The first and second embodiments are advantageously arranged such that optical information can be independently read out of each pixel row by use of a decreased number of vertical scanning circuit units which number is half the vertical pixel number; on the other hand, this arrangement may raise a problem in that an output signal contains dark signal components corresponding to two pixels causing the signal-to-noise (S/N) ratio to decrease. A third embodiment of the invention will now be described which can overcome such problem. Refer to FIG. 7, which shows a circuit configuration of the third embodiment. This embodiment concerns, but not exclusively, the use of a solid-state image pickup device having a 4×6 pixel matrix arrangement. In FIG. 7, the numeral "21" designates a horizontal scanning circuit for sequentially outputting pixel signals; "22" indicates a vertical scanning circuit; "22-11" to "22-3" are vertical scanning circuit units constituting the vertical scanning circuit 22; "23" is a selected-row changeover switch section which also constitutes the vertical scanning circuit 22; and, "24" shows pixels such as CMD elements capable of nondestructively reading signals indicative of incident light, which are organized in 4×6 matrix. These pixels 24 are controllable to be selectively in the nonselected, readout or reset state in response to the potential level of an output signal appearing on the horizontal pixel select lines.

The numeral "25" is an output terminal, and "26" designates a nonselect power supply. Vertical signal lines S1 to S4 intersect horizontal pixel select lines G1 to G6 among the matrix of pixels 24. Principally, the importance of this embodiment lies in taking case of the selected states of horizontally aligned pixels rows; in this respect, the horizontal scanning circuit 21 should not be limited to the illustrated configuration only as far as signals can be sequentially derived from those pixels being currently selected for readout state by the vertical scanning circuit 22. One row of pixels aligned in the horizontal direction are connected together to a corresponding one Gi of the horizontal pixel select lines G1–G6, whereas one column of pixels extending in the vertical direction are coupled in common to a corresponding one Si of the vertical signal lines S1–S4.

Any pixel 24 is in the nonselected state when its associated horizontal pixel select line Gi (i=1, 2, 3, . . . , 6) is applied with a nonselect potential, resulting in no signals being outputted onto a corresponding vertical signal line Si (i=1, 2, 3, 4). When a readout potential is given to the horizontal pixel select line Gi, the pixel 24 is in the readout state thus outputting a signal representative of incident light onto such vertical signal line Si. When a reset potential is applied to the horizontal pixel select line Gi, a packet of charge accumulated in pixel 24 is then drained away. The vertical scanning circuit units 22-1, 22-2, 22-3 provide the nonselect potential, readout potential and reset potential thereby controlling the state of pixel 24. Note here that a period during which the vertical scanning circuit units 22-1 to 22-3 output either one of the readout and reset potentials serves as a select period; during such select period, the reset potential is enabled for the horizontal blanking period (when the reset clock signal $\Phi R$ is at "H" level), whereas the readout potential is outputted during the remaining duration excluding the horizontal blanking period (when the clock $\Phi R$ is at "L" level).

The vertical scanning circuit units 22-1 to 22-3 have outputs connected via first switches SW1 to the odd-numbered rows of horizontal pixel select lines G1, G3, G5, respectively, to which lines a nonselect power supply 26 is coupled through third switches SW3. The outputs of the vertical scanning circuit units 22-1 to 22-3 are connected through second switches SW2 to the even-numbered rows of horizontal pixel select lines G2, G4, G6, respectively, to which lines the nonselect power supply 26 is coupled via fourth switches SW4. The first switches SW1 and fourth switches SW4 turn on when the clock $\Phi Li$ goes high (at "H" level), whereas the second and third switches SW2, SW3 turn on when the clock $\Phi Li$ drops at "L" level. Accordingly, when the clock $\Phi Li$ is at "H" level, the outputs L1, L2, L3 of respective vertical scanning circuit units 22-1 to 22-3 are supplied to the odd-numbered horizontal pixel select lines G1, G3, G5, respectively, while allowing the nonselect potential to be applied to the even-numbered horizontal pixel select lines G2, G4, G6. When the clock $\Phi Li$ is at "L" level, the outputs L1, L2, L3 of vertical scanning circuit units 22-1 to 22-3 are fed to the even-numbered horizontal pixel select lines G2, G4, G6, respectively, while allowing the nonselect potential to be applied to the odd-numbered horizontal pixel select lines G1, G3, G5.

Figure 8:
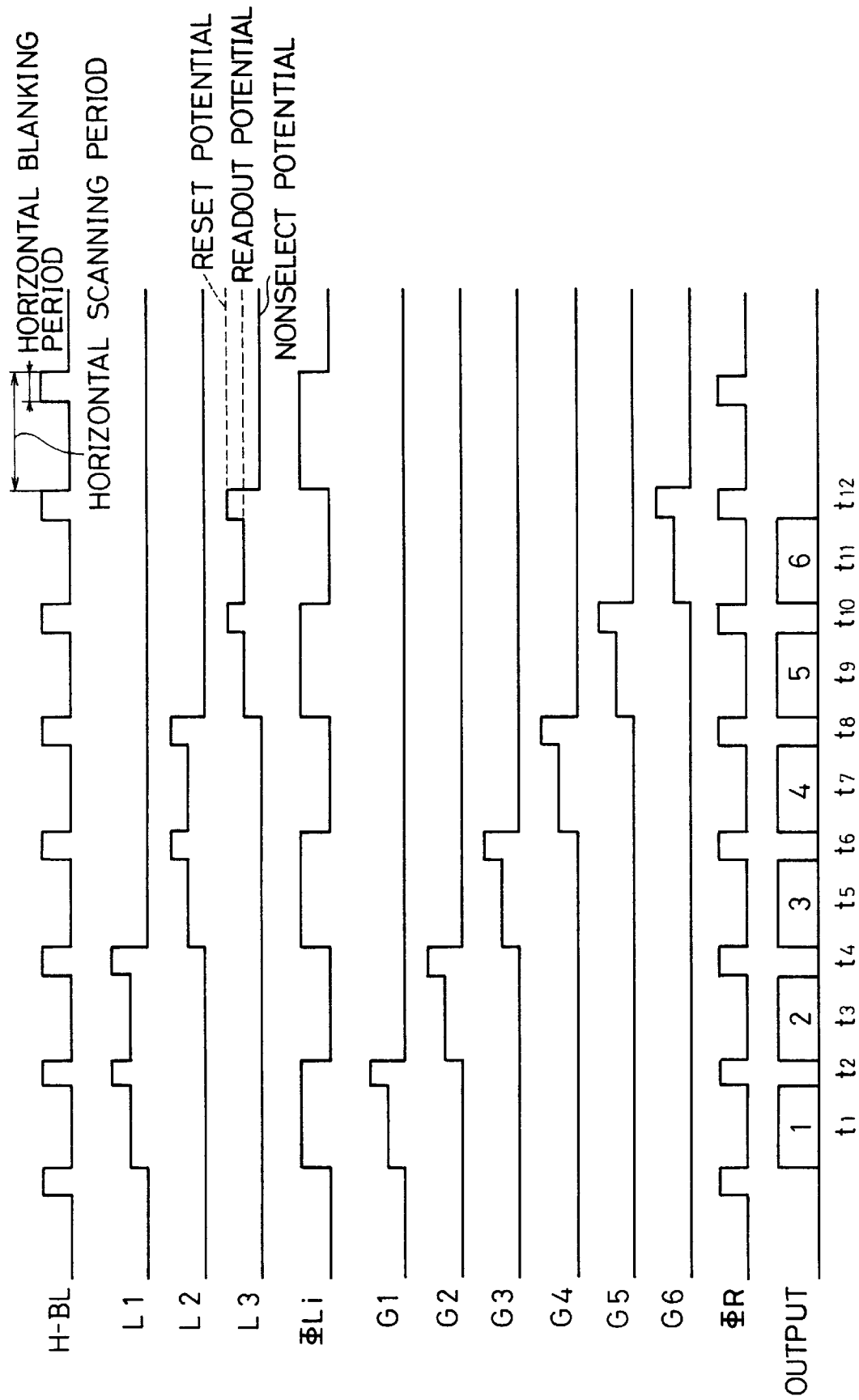
FIG. 8 is an illustration of a timing diagram showing the pulse sequence for the output operation of the embodiment of FIG. 7.
Figure 9:
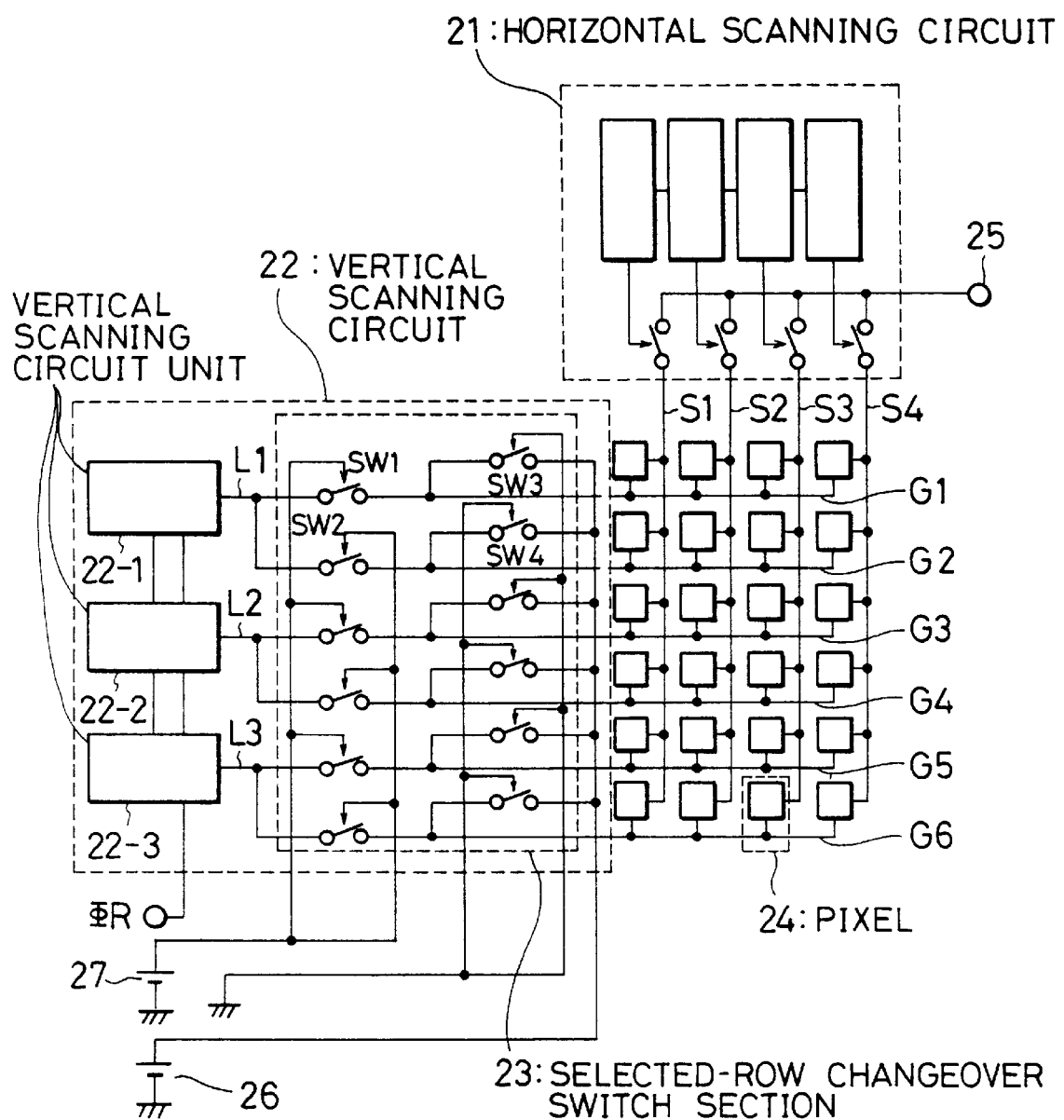
FIG. 9 is a diagram showing a circuit configuration of a solid-state image pickup device in accordance with a fourth embodiment of the invention.

The operation of the solid-state image pickup device thus arranged will now be described with reference to the timing diagram of FIG. 8. Here, the output of each vertical scanning circuit unit 22-1 to 22-3 may be a three-value signal having the lowest level corresponding to the nonselect potential, the highest level representing the reset potential, and the intermediate level indicating the readout potential. During a period from time $t_1$ to $t_4$, one output L1 of the vertical scanning circuit units 22-1 to 22-3 is selected and enabled. Since the clock $\Phi Li$ is at "H" level during a period from time $t_1$ to $t_2$, one horizontal pixel select line G1 is selected while the remaining rows of horizontal pixel select lines G2–G6 are in the nonselect state. Accordingly, at time $t_1$, signals are read out of the first row of pixels; at time $t_2$, any charge packet accumulated in the first row of pixels are drained away. Since the clock $\Phi Li$ maintains "L" level during a period from time $t_3$ to $t_4$, the second horizontal pixel select line G2 is selected while the remaining horizontal pixel select lines are in the nonselect state. As a consequence, at time $t_3$, signals are read from the second rows of pixels; at time $t_4$, any charge packet accumulated therein are discharged.

Similar operations will be repeated with respect to the third to sixth rows: signals are read from the third, fourth, fifth and sixth pixel rows at time $t_5$, $t_7$, $t_9$, $t_{11}$, respectively; charge packets accumulated in such rows are discharged at time $t_6$, $t_8$, $t_{10}$, $t_{12}$, respectively. It should be noted here that the potential change of clock $\Phi Li$ from "H" to "L" level is done when the output of the vertical scanning circuit unit becomes stably to the nonselect potential level after the output of the vertical scanning circuit unit outputted the reset potential level to the selected row during the horizontal blanking period.

As has been apparent from the explanation mentioned above, the pixel signals are sequentially read out of each row without permitting occurrence of any mixture with other pixel signals. While this embodiment assumes that the pixels are of nondestructive readable ones, if destructive readout elements are employed which may allow charge packets accumulated therein to be read and discharged at a time, the aforementioned reset operations to be performed for selected pixels during the horizontal blanking period will no longer be required.

A solid-state image pickup device in accordance with a fourth embodiment of the invention is similar to the third embodiment shown in FIG. 7 with the clock $\Phi Li$ supply line being replaced by an additional power supply 27 and ground connections. More specifically, the additional power supply 27 acts as an "H" level power supply, which has a positive terminal coupled to control terminals of the first and second switches SW1, SW2 as shown. The control terminals of the remaining, third and fourth switches SW3, SW4 are coupled to ground. These connections enable the control terminals of first and second switches SW1, SW2 to be constantly applied with "H" level potential thereby forcing them to be always conductive, whereas those of third and fourth ones SW3, SW4 are constantly at "L" level potential rendering them nonconductive at any event. Accordingly, with such an arrangement, respective outputs L1, L2, L3 of the vertical scanning circuit units 22-1 to 22-3 may be sent forth toward a corresponding pair of the horizontal pixel select lines, that is, a first pair of horizontal pixel select lines G1 and G2, a second pair G3, G4, and a third pair G5, G6, respectively.

Figure 10:
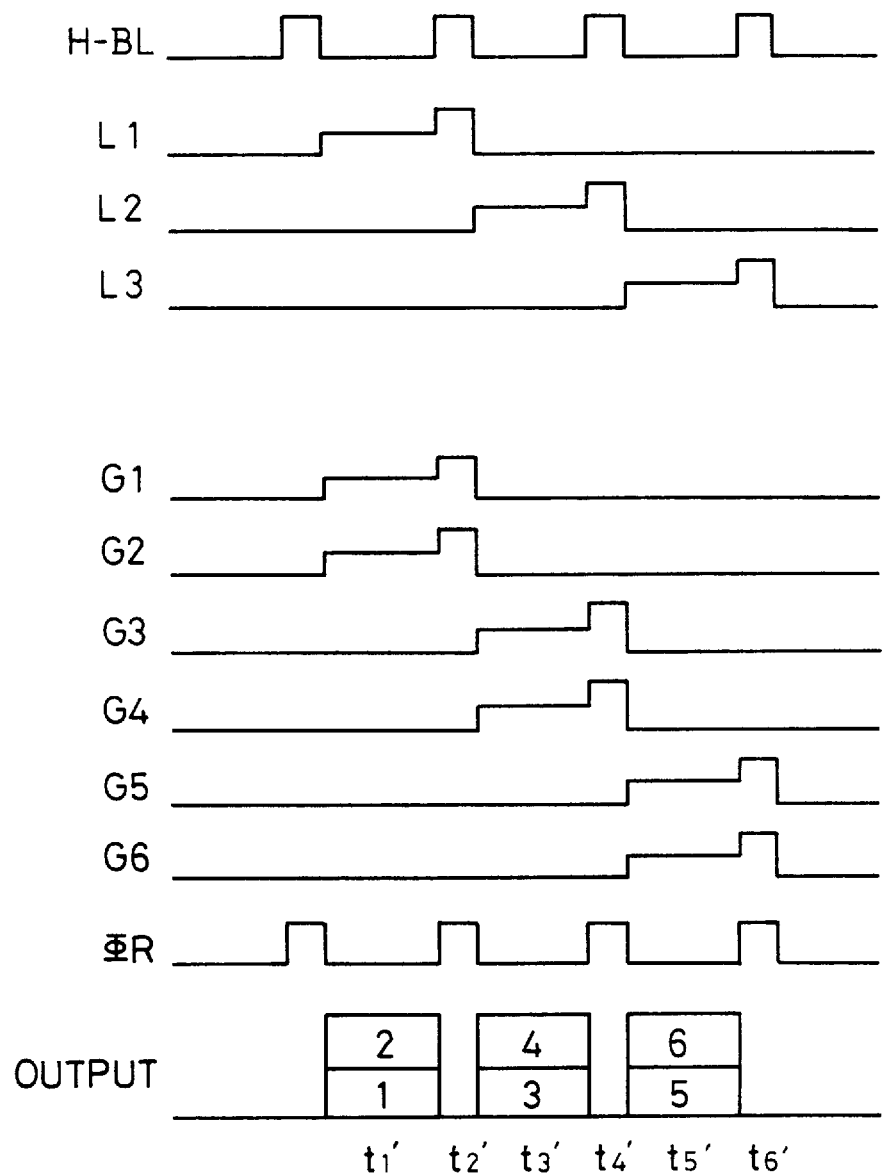
FIG. 10 is an illustration of a timing diagram showing the pulse sequence for the output operation of the embodiment of FIG. 9.

The operation of this embodiment will be described with reference to the timing chart shown in FIG. 10. At time $t_1'$, one output L1 of the vertical scanning circuit units 22-1 to 22-3 is set at the readout potential level while the remaining outputs L2, L3 thereof are at the nonselect level; at time $t_2'$, the output L1 is at the reset level while the outputs L2, L3 are kept at the nonselect level; at time $t_3'$, another output L2 is at the readout level while the other outputs L1, L3 are at the nonselect level; at time $t_4'$, the output L2 is at the reset level while the others L1, L3 are kept at the nonselect level; at time $t_5'$, the last output L3 is at the readout level while the outputs L1, L2 are at the nonselect level; and, at time $t_6'$, the output L3 is at the reset level while the others L1, L2 are kept at the nonselect level.

The result of the fact that the first and second switches SW1, SW2 are constantly conductive (on) while the third and fourth switches SW3, SW4 are always nonconductive (off) is as follows: at time $t_1'$, the horizontal pixel select lines G1, G2 are at the readout level while the remaining horizontal pixel select lines G3–G6 are at the nonselect level; at time $t_2'$, the horizontal pixel select lines G1, G2 are at the reset level while the remaining horizontal pixel select lines G3–G6 are kept at the nonselect level; at time $t_3'$, the horizontal pixel select lines G3, G4 are at the readout level while the other horizontal pixel select lines G1–G2, G5–G6 are at the nonselect level; at time $t_4'$, the horizontal pixel select lines G3, G4 are at the reset level while the other horizontal pixel select lines G1–G2, G5–G6 are kept at the nonselect level; at time $t_5'$, the horizontal pixel select lines G5, G6 are at the readout level while the other horizontal pixel select lines G1–G4 are at the nonselect level; at time $t_6'$, the horizontal pixel select lines G5, G6 are at the reset level while the other horizontal pixel select lines G1–G4 are kept at the nonselect level.

Consequently, at time $t_1'$, readout signals from the first and second pixel rows are mixed together to be outputted. Similarly, at time $t_3'$, readout signals from the third and fourth pixel rows are mixed together to be outputted; at time $t_5'$, readout signals from the fifth and sixth pixel rows are mixed together to be outputted. With such a specific scanning scheme, the sensitivity can be doubly increased and simultaneously the required time for readout can be half decreased while the resulting resolution may somewhat be reduced to half of the ordinary one.

Figure 11:
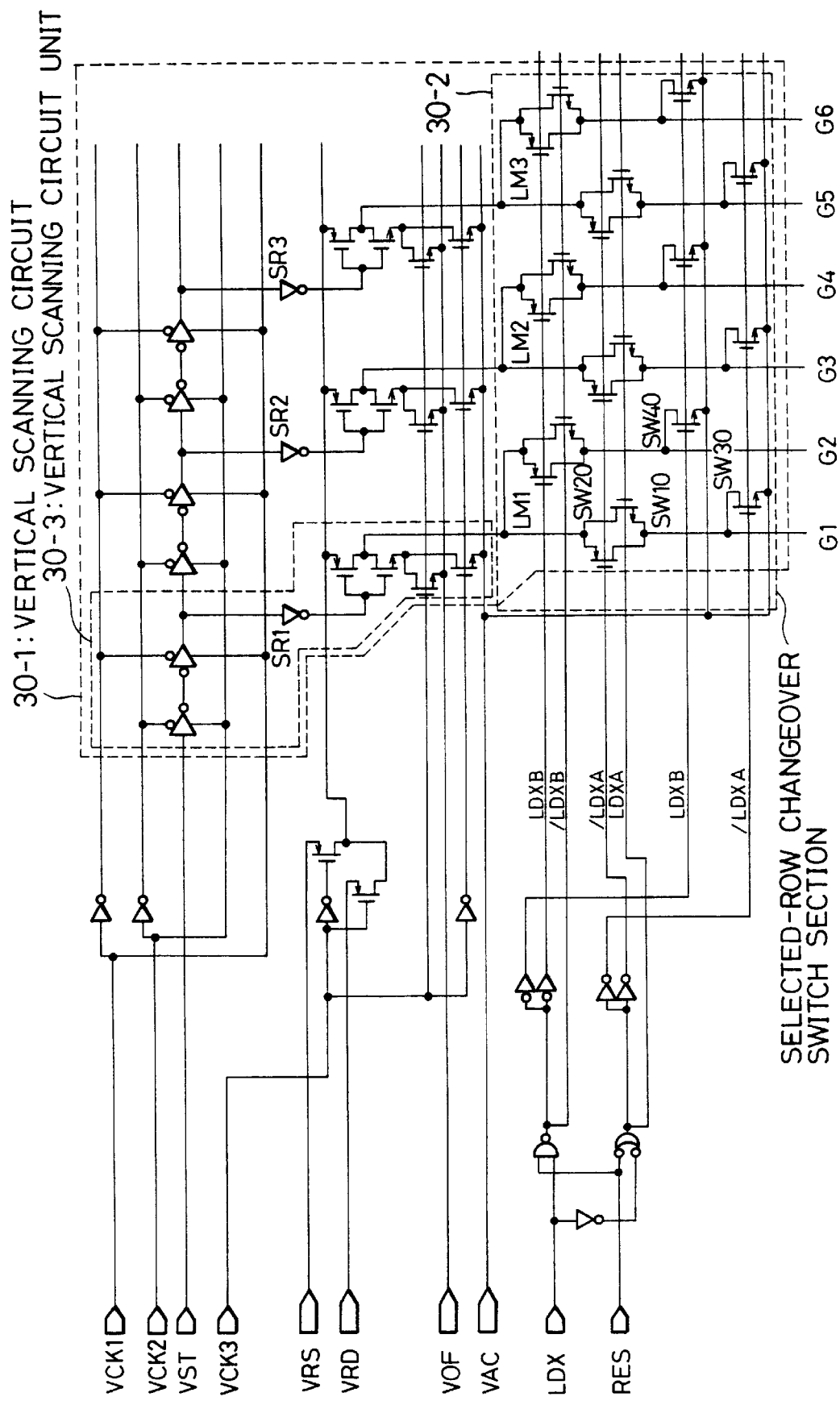
FIG. 11 is a diagram showing one practical circuit configuration of a vertical scanning circuit in case where CMD solid-state image pickup elements are employed as a pixel array in the embodiment of FIG. 7.

A practical configuration of the vertical scanning circuit as adapted in the third embodiment of FIG. 7 is illustrated in FIG. 11, which assumes that CMD image pickup elements are employed as the array of pixels. The circuit configuration of FIG. 11 is for six rows of pixels, by way of example. A dot-line block 30-1 is a vertical scanning circuit, a block 30-2 is a selected-row changeover switch section, and a block 30-3 is one vertical scanning circuit unit: these blocks may correspond to the vertical scanning circuit 22, the selected-row changeover switch circuit 23 and the vertical scanning circuit units 22-1, 22-2, 22-3, respectively. With the CMD image pickup elements, their image pickup operations are controlled by potentially changing the voltages being applied to the gates of CMDs. For a currently selected row, the vertical scanning circuit unit 30-3 provides a readout voltage VRD during the readout period, and a reset voltage VRS within the horizontal blanking period. For the remaining nonselected rows, the vertical scanning circuit unit 30-3 provides an accumulation voltage VAC for rendering pixels nonselected state during the readout period, and an overflow voltage VOF within the horizontal blanking period. Here, the overflow operations are of draining away any extra accumulation charge during each horizontal blanking period, thereby suppressing or eliminating occurrence of blooming.

A clock signal VCK3 changes in potential between the "L" and "H" levels, wherein the former may correspond to assignment of the readout period, whereas the latter to assignment of the overflow or reset period. Clock signals VCK1, VCK2, VST are adopted to control the select/nonselect state of the vertical scanning circuit unit 30-3. The selected-row changeover switch section 30-2 is controlled in operation by clock signals LDX, RES. Additionally, a clock signal LDX may be identical with the selected-row changeover clock signal $\Phi$Li in the previous embodiment of FIG. 7.

Switches SW10, SW20 which may correspond to the first and second switches SW1, SW2 of FIG. 7 are each constituted from a pair of parallel-connected NMOS and PMOS transistors. Other switches SW30, SW40 for performing switching operations to thereby set at the accumulation potential having a lower potential level, these switches correspond to the third and fourth switches SW3, SW4 of FIG. 7, employ NMOS transistors only. The PMOS transistor of switch SW10 and the NMOS transistor of switch SW30 have gates to which an inverted clock signal /LDXA of clock LDXA is supplied. The NMOS transistor of switch SW10 has a gate to which the clock LDXA is applied. The PMOS transistor of switch SW20 and the NMOS transistor of switch SW40 have gates to which a clock signal LDXB is supplied. The NMOS transistor of switch SW20 has a gate to which an inverted clock signal /LDXB of the clock LDXB is applied. The clock LDXA is an output signal of a NAND gate, which receives an inverted clock of LDX and the clock RES; the clock LDXB is an inverted output of a NAND gate which receives the clocks LDX, RES. Additionally, the configuration of the vertical scanning circuit unit 30-3 has also been described in Japanese Patent Application Laid-open No. 5-227486.

Figure 12:
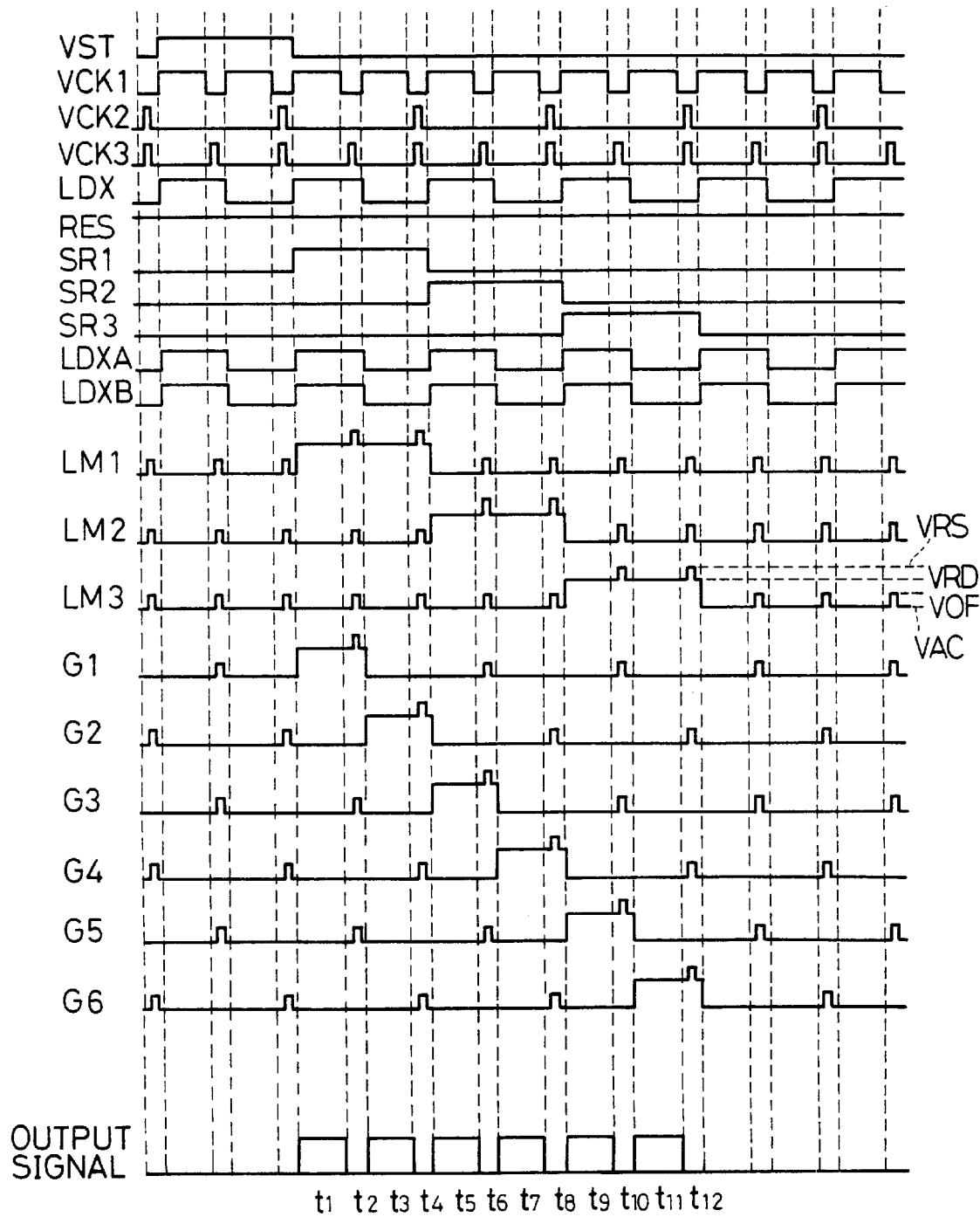
FIG. 12 is an illustration of a timing diagram showing the pulsing sequence for the operation of the vertical scanning circuit shown in FIG. 11.

The operation of the vertical scanning circuit arranged as shown in FIG. 11 will be described with reference to the timing diagram of FIG. 12, first for the case where the clock RES is at "H" level. At the clock LDXA, LDXB terminals, the clock LDX directly emerges with its native potential. The signals VCK1, VCK3 are specific clocks having one cycle equivalent to the horizontal scanning period, wherein the clock VCK1 is at "L" while the clock VCK3 is at "H" level within the horizontal blanking period. The duration of "H" level period of clock VCK3 is included within the "L" level period of the clock VCK1. The signal VCK2 is a clock which excludes an "H" level pulse component of the clock VCK3 every time when each cycle has elapsed. The signal LDX is a clock which is synchronized to the rising edge of the clock VCK1 to be at "H" level during the first half of the horizontal scanning period and then at "L" level during the second half thereof within one cycle of the clock VCK2.

During several periods from time $t_1$ to $t_2$, $t_5$ to $t_6$ and $t_9$ to $t_{10}$, the clock LDX is at "H" level causing the outputs LM1, LM2, LM3 of vertical scanning circuit unit 30-3 to send forth toward the horizontal pixel select lines G1, G3, G5, respectively, while allowing the accumulation voltage VAC to be applied onto the remaining horizontal pixel select lines G2, G4, G6. During periods from time $t_3$ to $t_4$, $t_7$ to $t_8$ and $t_{11}$ to $t_{12}$, the clock LDX is at "L" level causing the outputs LM1–LM3 of the vertical scanning circuit unit 30-3 to be transferred to the horizontal pixel select lines G2, G4, G6, respectively, while allowing the accumulation voltage VAC to be applied to the other horizontal pixel select lines G1, G3, G5. During a period from time $t_1$ to $t_4$, a clock signal SR1 is at "H" level causing the output LM1 of the vertical scanning circuit unit 30-3 to receive the readout voltage VRD when the clock VCK3 is at "L" level and to alternatively receive the reset voltage VRS when the clock CVK3 is at "H" level. Under such condition, the accumulation voltage VAC is outputted to the remaining outputs LM2, LM3 of the vertical scanning circuit unit 30-3 when the clock VCK3 is at "L" level; when this clock VCK3 is at "H" level, the overflow voltage VOF is alternatively supplied thereto.

Accordingly, at time $t_1$, the readout voltage VRD is outputted to the horizontal pixel select line G1, whereas the accumulation voltage VAC is supplied to the remaining horizontal pixel select lines G2–G6; at time $t_2$, the reset voltage VRS emerges on the horizontal pixel select line G1 while the overflow voltage VOF is applied to the horizontal pixel select lines G3, G5 whereas the accumulation voltage VAC is fed to the remaining horizontal pixel select lines G2, G4, G6. Subsequently, at time $t_3$, the readout voltage VRD emerges on the horizontal pixel select line G2, whereas the accumulation voltage VAC is transferred to the horizontal pixel select lines G1, G3–G6; at time $t_4$, the reset voltage VRS emerges at the horizontal pixel select line G2 while the overflow voltage VOF is applied to the horizontal pixel select lines G4, G6 whereas the accumulation voltage VAC is fed to the other horizontal pixel select lines G1, G3, G5. After time $t_5$ similarly, the readout voltage VRD is fed to the horizontal pixel select line G3 at time $t_5$, to the select line G4 at time $t_7$, to the line G5 at time $t_9$, and to line G6 at time $t_{11}$, respectively; the reset voltage VRS is supplied to the line G3 at time $t_6$, to line G4 at time $t_8$, to line G5 at time $t_{10}$, and to line G6 at time $t_{12}$, respectively.

As can be seen from the above description, since the readout voltages VRD are sequentially outputted from the horizontal pixel select lines G1–G6, single-row independent sequential-scanning may be attained by positioning one vertical scanning unit for two rows. Note here that only one overflow operation for suppressing occurrence of any blooming signals is effected for two successive horizontal scanning periods; this may possibly reduce the blooming suppression ratio as compared with the case where the overflow operation is effected for each horizontal scanning period. However, this will not raise serious problems in practical applications for the reason that any extension of time for accumulation of blooming signals is limited not to go beyond the length of one horizontal scanning period.

Figure 13:
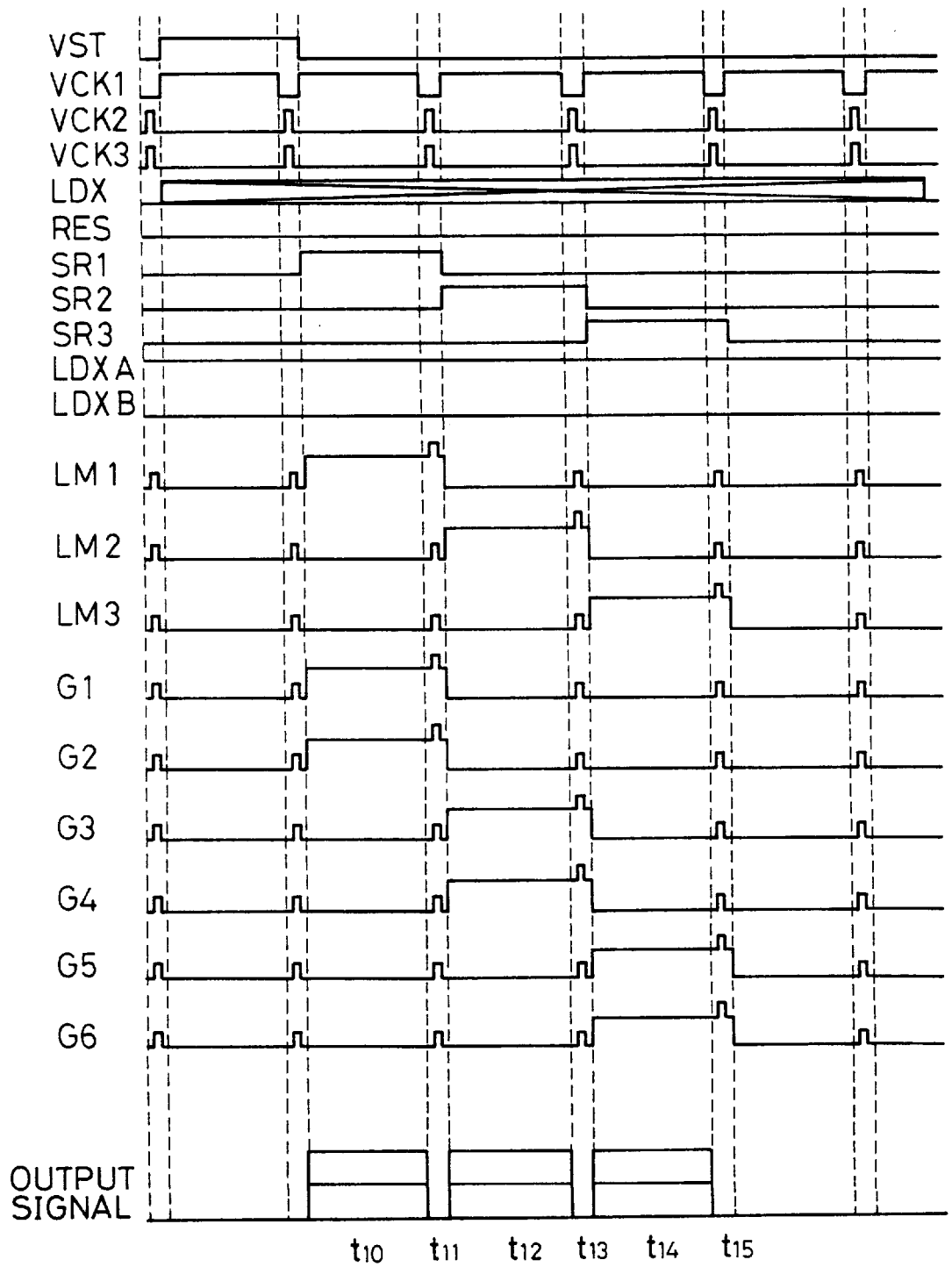
FIG. 13 is an illustration of a timing diagram showing the pulsing sequence for another operation mode of the vertical scanning circuit of FIG. 11.

The operation of the vertical scanning circuit of FIG. 11 will continue to be described by discussing here about the case where the clock RES is at "L" level. When this clock RES is at "L" level, the clock LDXA is potentially fixed at "H" level whereas the clock LDXB is at "L" level. With such processing, the switches SW10, SW20 are forced to be always kept conductive while the switches SW30, SW40 are to be nonconductive. The clock VCK2 may be identical in pulsing sequence with the clock VCK3. As a consequence, the outputs LM1–LM3 of the vertical scanning circuit unit 30-3 are supplied to the horizontal pixel select line pairs G1-G2, G3-G4 and G5-G6, respectively, while the select/ nonselect operations are carried out with two rows being as a unit. Such operation will be explained, by way of example, with reference to the timing chart shown in FIG. 13. During a period from time $t_{10}$ to $t_{11}$, the clock signal SR1 is at "H" level; at time $t_{10}$, the readout voltage VRD is supplied to the output LM1 while the accumulation voltage VAC is to the outputs LM2, LM3; and, at time $t_{11}$, the reset voltage VRS is fed to the output LM1 while the overflow voltage VOF is to the outputs LM2, LM3.

The switches SW10, SW20 are forced to be conductive and the switches SW30, SW40 are rendered nonconductive: therefore, at time $t_{10}$, the readout voltage VRD emerges on the horizontal pixel select lines G1, G2 while the accumulation voltage VAC is outputted to the select lines G3–G6; at time $t_{11}$, the reset voltage VRS is applied to the lines G1, G2 while the overflow voltage VOF is fed to lines G3–G6. Thereafter, the read voltage VRD or reset voltage VRS will be outputted to respective pairs of such select lines G1–G2, G3–G4 and G5–G6.

As is apparent from the previous explanation, the two-row mixed readout sequential-scanning may be accomplished in case where the clock signal RES is set at "L" level. With such operations, the sensitivity can be doubly increased and simultaneously the required readout time can be half decreased, while the resolution may be reduced to half of the ordinary one. Consequently, when the data rate is constant, it becomes possible to read the entire-picture plane information with the time being half-shortened.

It should be noted that the exemplary configuration of the vertical scanning circuit is explained under an assumption that CMD image pickup elements are employed as the array of pixels; obviously, in case of using any other types of elements such as X-Y addressing image pickup elements, similar advantages will also be obtained by modifying the vertical scanning circuit units such that the configuration thereof is suitably adapted for respective pixels.

It should be also noted that in the third and fourth embodiments, while one vertical scanning circuit unit is provided for two neighboring pixel rows, the each-row independent sequential-scanning scheme may alternatively be achieved by modifying the arrangement so that one vertical scanning circuit unit is provided for an increased number of (three, or more) adjacent pixel rows while enabling the vertical scanning circuit unit being to continue generation of the select signal throughout three or more successive horizontal scanning periods.

As has been described above based on several embodiments, with the present invention, it is possible to provide solid-state image pickup devices capable of attaining the all-pixel independent sequential-scanning readout scheme by use of the vertical scanning circuit consisting of a decreased number of vertical scanning circuit units, which number is half the number of pixels in the vertical direction, without allowing outputs of two vertically aligned pixels to be mixed together. It is another advantage of the invention is that the input terminals can be reduced in number while letting drive operations become easier due to the arrangement that the first and second switches are controllable by a single input clock signal in the solid-state image pickup devices. It is still another advantage of the invention is that, since the first and second switches consist of MOS transistors, such switches can be integrated on the same substrate of solid-state image pickup device thus enabling the entire structure to reduce in scale and in size. It is a further advantage of the invention is that any signals can be uniformly read from a corresponding row of pixels associated with the vertical scanning circuit unit and the remaining pixel rows to which the vertical scanning circuit unit does not correspond in the solid-state image pickup devices. It is a still further advantage of the invention is that a dark output, which will be contained in all-pixel independent sequential-scanning readout signals and which does not rely upon any optical information of incident light, can be obtained without the use of any additional light-shielding mechanisms for the solid-state image pickup devices. It is a yet further advantage of the invention is that it is possible to provide the solid-state image pickup devices capable of achieving the all-pixel independent sequential-scanning readout scheme without having to decrease the resulting S/N ratio while allowing the required number of vertical scanning circuit units to be half the number of pixels in the vertical direction.

What is claimed is:

1. A solid state image pickup device, comprising:

an array of rows and columns of pixels;

a vertical scanning circuit having a plurality of vertical scanning circuit units arranged to correspond to alternate ones of the pixel rows in a vertical direction for selecting a row for read out from the rows of said array;

a horizontal scanning circuit for taking a pixel signal out of the read out row selected by said vertical scanning circuit;

first switch means for transferring an output of each of said plurality of vertical scanning circuit units to a preceding pixel row of a pixel row corresponding to each unit; and second switch means for transferring an output of each scanning circuit unit to a succeeding pixel row of the pixel row corresponding to said each scanning circuit unit, wherein each of said plurality of vertical scanning circuit units generates a select signal during two successive horizontal scanning periods, said first switch means is rendered conductive in a first horizontal scanning period of said two successive horizontal scanning periods and then becomes nonconductive in a subsequent horizontal scanning period, said second switch means is rendered nonconductive in the first horizontal scanning period and then becomes conductive in the subsequent horizontal scanning period, and switching operations of the first and second means are carried out during a horizontal blanking period.

2. The solid state image pickup device according to claim 1, wherein said each vertical scanning circuit unit is disposed to correspond to odd-numbered pixel rows of said array of pixels.

3. The solid state image pickup device according to claim 1, wherein said each vertical scanning circuit unit is disposed to correspond to even-numbered pixel rows of said array of pixels.

4. The solid state image pickup device according to claim 1, wherein said second switch means is arranged to be controlled by an inverted clock of a clock for use in controlling said first switch means.

5. The solid state image pickup device according to claim 1, wherein the first and second switch means comprise metal oxide semiconductor (MOS) transistors.

6. The solid state image pickup device according to claim 1, further comprising switch means being identical in arrangement to one of the first and second switch means and provided between the pixel row corresponding to said each vertical scanning circuit unit and the output thereof, for being constantly rendered conductive.

7. The solid stage image pickup device according to claim 1, wherein said vertical scanning circuit is arranged to nondestructively read a signal of each pixel of pixel rows being selected for readout state, and switching operations of the first and second switch means during a horizontal blanking period is arranged to be carried out after optical information stored in each pixel selected for readout state during a horizontal scanning period prior to said switching operations is reset.

8. The solid stage image pickup device according to claim 1, wherein said vertical scanning circuit is arranged to nondestructively read a signal of each pixel of pixel rows selected for readout state, and said vertical scanning circuit is arranged to reset optical information stored in each pixel being selected for readout state after the switching operations of the first and second switch means are performed during a horizontal blanking period.

9. A solid state image pickup device comprising:

an array of rows and columns of pixels;

a vertical scanning circuit having a plurality of vertical scanning circuit units each arranged correspondingly to two adjacent pixel rows in a vertical direction;

a horizontal scanning circuit for taking a pixel signal out of a pixel row as selected by said vertical scanning circuit;

first switch means for allowing an output of said vertical scanning circuit unit to pass through toward one pixel row corresponding to one of said plurality of vertical scanning circuit units;

second switch means for allowing the output of said vertical scanning circuit unit to pass through toward another pixel row corresponding to said vertical scanning circuit unit;

third switch means for forcing said one pixel row to a nonselected state; and fourth switch means for forcing said another pixel row to a nonselected state, wherein the output of each said vertical scanning circuit unit is generated during two successive horizontal scanning periods.

10. The solid stage image pickup device according to claim 9, wherein the first, second, third and fourth switch means comprise metal oxide semiconductor (MOS) transistors.

11. The solid state image pickup device according to claim 9, wherein the first and fourth switch means are opposite in conductive and nonconductive states to the second and third switch means during horizontal scanning periods while switching operations thereof are performed during horizontal blanking periods.

* * * * *